Aug. 15, 1939.     A. H. JESSEN     2,169,495
TRANSMISSION SYNCHRONIZER AND GEAR LOCK-UP
Filed June 22, 1936
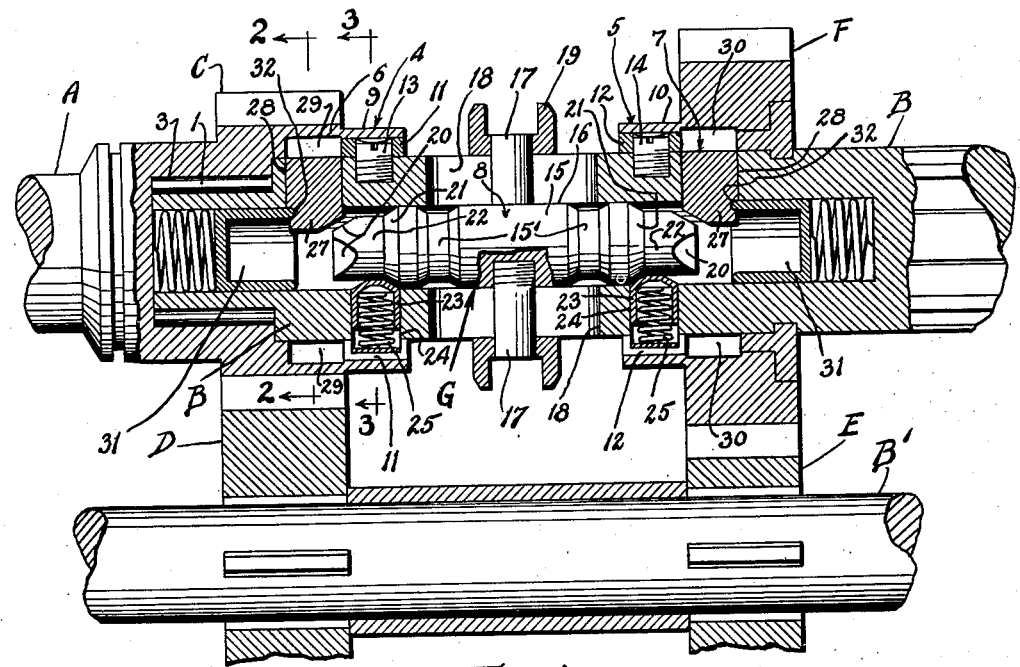
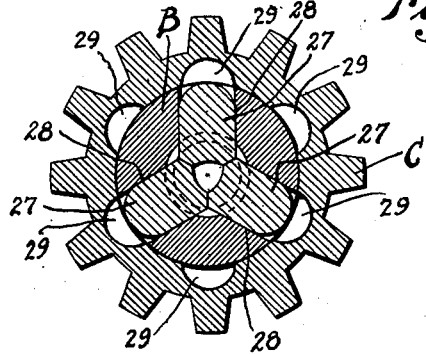
Fig.2
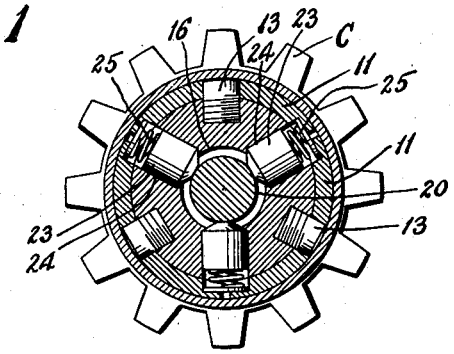
Fig.3
Fig.4
Fig.5
INVENTOR.
Arnold H. Jessen
BY
ATTORNEY Patented Aug. 15, 1939

2,169,495

UNITED STATES PATENT OFFICE 2,169,495

TRANSMISSION SYNCHRONIZER AND GEAR LOCK-UP

Arnold H. Jessen, Los Angeles, Calif.

Application June 22, 1936, Serial No. 86,615

6 Claims. (Cl. 192—53)

This invention relates to and has for an object the provision of a compact, simply constructed and highly efficient combination synchronizer and gear lock-up device for automotive transmission mechanisms, particularly such mechanisms as disclosed in my application for patent filed April 6, 1936, Serial Number 72,985.

Another object of this invention is to provide a transmission operating unit which, as a small device taking up but a minimum of space, will serve as a gear ratio selector, a synchronizer, a positive lock-up means for selected gears, and permit driving and driven elements of the transmission mechanism to be selectively, directly or indirectly connected in a positive and efficacious manner.

A further object is to provide transmission mechanism in which the combined synchronizing and gear lock-up unit may be conveniently carried for the most part within one of the shafts, for example, the driven shaft, whereby to take up less room, to simplify the construction and to render more reliable and positive the operation thereof.

Other and more detailed objects of invention will appear as the description progresses.

I have shown a preferred form of the invention in the accompanying drawing, subject to modification within the scope of the appended claims, without departing from the spirit thereof.

In said drawing:

Fig. 1 is a fragmentary sectional view of the transmission mechanism of this invention;

Fig. 2 is a section on line 2—2 of Fig. 1;

Fig. 3 is a section on line 3—3 of Fig. 1;

Fig. 4 is an end elevation of the shifting member; and

Fig. 5 is an inside plan view of one of the friction shoes.

The transmission mechanism of the invention as illustrated in the accompanying drawing comprises a driving shaft A, a driven shaft B, a countershaft B, gears C, D, E and F for indirectly connecting the driving and driven shafts, and the combination synchronizing and gear lock-up means G which in its initial operation synchronizes the elements selected for connection and then connects and locks together said selected elements as the final operation thereof, said means G serving as the medium for directly connecting said driving and driven shafts.

As here shown the means G is carried for the most part by the driven shaft B and when in neutral position (see Fig. 1) maintains the driven shaft free from direct and indirect connection with the driving shaft. When moved into one operative position the means G first synchronizes the driving and driven shafts, then locks them in direct connection with one another, and when moved into another operative position first synchronizes the loosely mounted gear F and driven shaft—then locks said gear to said driven shaft and thereby indirectly connects the driving and driven shafts through gears C, D, E and F. It will be noted that the gear C is fixed on an end of the driving shaft A—as for example, by being formed integrally therewith, whereas gear F is loosely mounted on shaft B, and the means G is operable between said two gears C and F.

In the present embodiment of this invention the driving and driven shafts are coaxial and the driven shaft is journalled by means of bearings 1 within a bore 3 formed in said driving shaft.

The combination synchronizing and gear lock-up means G generally comprises a friction clutch device 4 for synchronizing the driven and driving shafts, a similar device 5 for synchronizing gear F and the driven shaft, a gear lock-up device 6 for directly connecting said driving and driven shafts, a similar lock-up device 7 for connecting said gear F with the driven shaft, and selectively shiftable means 8 on the driven shaft for initially engaging and operating the friction clutch devices and finally engaging and operating said lock-up devices.

As here shown the friction clutch devices 4 and 5 comprise annular clutch members 9 and 10 fixed on the gears C and F and surrounding and engaging sets of segmental friction shoes 11 and 12. These shoes are secured by fastenings 13 and 14 to the driven shaft B so as to rotate therewith and be radially movable with respect thereto into frictional contact with said annular members 9 and 10 whereby to synchronize the engageable elements as aforesaid.

The means 8 includes an actuator member 15 shiftably mounted in a bore 16 formed in the driven shaft B, there being a pin 17 extending through said member 15 and slots 18 and which secures a shift sleeve 19 to said member. This sleeve provides for the usual operative connection with a shift lever not shown. The ends of the member 15 are reduced and formed with cam portions 20 and 21 and intermediate cylindrical portions 22. Normally these portions 22 are engaged by the closed ends of cup members 23 which are slidable in radial openings 24 in the shaft B. Springs 25 are mounted in said cups and extend through said radial openings so as to engage the friction shoes 11 and 12, said springs being under but light, or in fact no tension whatsoever when the parts are in the aforesaid normal position. However, it should be noted that the cups 23 do engage the cam surfaces 21 when the member 15 is in neutral position and thereby serve to hold said member 15 against unintentional movement out of said position. When the member 15 is shifted, for example, so as to directly engage the driving and driven shafts A and B, the cups 23 will be forced outward by cam surface 21 and through the springs 25 will yieldably urge the shoes 11 into frictional engagement with the annular member 9 on driving shaft A. This will provide for synchronizing the driving and driven shafts and it will be obvious that when the member 15 is shifted in the opposite direction the clutch device 5 will be operated to synchronize the gear F and shaft B.

The gear lock-up devices 5 and 6 each comprise radially extensible locking pins 27 which are slidable in openings 28 in the shaft B and adapted to be extended into locking engagement with the shaft A and gear F, respectively. In the shaft A and gear F are depressions or sockets 29 and 30 which are adapted to receive the outer ends of said locking pins when the latter are forced outwardly by the inner ends thereof being engaged with the cam portions 20 on the shiftable member 15.

It will now be apparent that when the shiftable member is moved in either direction from its neutral position it will first cause one of friction clutch devices 4 and 5 to synchronize the selected element to be connected and then actuate one of the lock-up devices 6 and 7 to lock said selected elements together.

It will be noted that by having the combination synchronizing and gear lock-up means housed for the most part within the driven shaft, an economy in space, a simplified construction and a positive and reliable operation will be provided in an efficacious manner.

The devices 4 and 5 serve effectively as bearings in that the annular members 9 and 10 ride freely on the shoes 11 and 12 which are engaged with and fixed to the driven shaft B so as to rotate therewith yet be radially movable with respect thereto.

It will be noted that the rocking pins of each set are held in normal position by spring urged cup-like members 31, edges of which are releasably engaged in notches 32 in said pins. These cup members 31 release the pins when the cam portions 20 engage and push outwardly the inner ends of said pins.

Emphasis is laid on the fact that the devices 4 and 5 have the three fold function of serving as thrust bearings, as bearings carrying the radial loads and as means for synchronizing the driven and driving elements. Furthermore, the spring means for yieldably actuating the friction shoes of these synchronizing devices also serve to maintain the shifting member against unintentional movement out of neutral and all operative positions. It should be noted that the shifting member 15 is provided with annular grooves 15' to receive the spring urged cups 23 when said member is in positions for operating the devices 6 and 7.

It should be noted that when the pins 27 of one set are pushed outwardly by the beveled portions 20, said pins can yet be moved outwardly and are so moved upon contact therewith of the cam surface 21. This will dispose the pins 27 out of the way of the member 15, which is then free to move to a position such that one of the spring urged cups 23 will engage in the annular groove 15'.

What I claim is:

1. In a transmission mechanism, rotary members, one of said members having an axial bore, locking elements on the other of said members, synchronizing elements on said other member, locking elements carried by and being radially extensible from said one member for locking engagement with the corresponding elements on said other member, synchronizing elements mounted on said one member for extension therefrom into engagement with corresponding elements of said other member, an actuator slidable in the bore of said one member and initially engaging and extending the extensible synchronizing elements and finally engaging and extending said extensible locking elements, and means for sliding said actuator in either direction.

2. In a transmission mechanism, rotary members, a plurality of pins fixed to and radially extensible from one of said rotary members, the other of said rotary members having pin receiving sockets, a synchronizing clutch shoe mounted for rotation with and being radially extensible from said one rotary member, an annular portion on said other rotary member surrounding said clutch shoe, an actuator slidable in said one rotary member to successively engage and extend radially outward the clutch shoe and said pins, means for so sliding said actuator, spring means engaging and holding said actuator in operative position and through which said actuator yieldably extends said shoe when moved out of said neutral position.

3. In a transmission mechanism, rotary members, pins fixed to and extensible radially from one of said rotary members, the other of said rotary members having pin receiving sockets, a synchronizing clutch shoe mounted for rotation with and being radially extensible from said one rotary member, an annular portion on the other rotary member and surrounding said clutch shoe, an actuator slidable in said one member to successively engage and extend radially outward the clutch shoe and pins, means for sliding said actuator, said annular portion and said shoe being engaged at all times.

4. A transmission mechanism comprising rotary members, means carried by one of said members for locking said members for joint rotation, a frictional synchronizing device associated with said members, a shiftable member in said one rotary member initially movable to engage and operate said friction device and finally movable to engage with said locking means for connecting said members for joint rotation, said friction device including friction shoes carried by said one rotary member and adapted to engage said other rotary member and spring means arranged to be engaged by said shiftable member for yieldably extending said shoes, said spring means normally operating to hold said shiftable member in operative position.

5. A transmission mechanism comprising rotary members, means carried by one of said rotary members for locking said rotary members for joint rotation, a frictional synchronizing device associated with one of said rotary members, and a shiftable member in said one rotary member initially engageable with said friction device and finally movable for engagement with said locking means for connecting said members for joint rotation, said friction device comprising an annular member carried by one of said rotary members, a friction shoe normally having bearing engagement with said annular member and fixed on and extensible from the other of said rotary members into frictional contact with said annular member, said locking device including pins extensible from said one rotary member to engage the other rotary member and portions on an end of said shiftable member for engaging and extending said pins.

6. A transmission mechanism comprising rotary members, means carried by one of said members for locking said members for joint rotation, a frictional synchronizing device associated with said members, a shiftable element in one of said rotary member and being initially movable to engage and operate said friction device and finally movable to engage and operate said locking means, said friction device comprising an annular portion carried by said other rotary member and a friction shoe normally engaging said portion and fixed on and extensible from the other rotary member for frictional contact with said annular portion, said locking device including pins extensible from said one rotary member to engage said other rotary member, portions on said shiftable member for engaging and extending said pins, spring means for yieldably extending said shoes and other portions spaced inwardly from the first named portions on said shiftable member for engaging and operating said spring means to extend said shoe.

ARNOLD H. JESSEN.